US006311548B1

(12) United States Patent
Breidenbach et al.

(10) Patent No.: US 6,311,548 B1

(45) Date of Patent: Nov. 6, 2001

(54) METHOD OF VALIDATING A DIAGNOSTIC LEAK DETECTION TEST FOR A FUEL TANK

(75) Inventors: Hallett D. Breidenbach, West Bloomfield; Kenneth M. Simpson, Howell; Stephen F. Majkowski, Rochester Hills, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/382,527

(22) Filed: Aug. 25, 1999

(51) Int. Cl.$^7$ .............................. G01M 3/00; G01M 3/26

(52) U.S. Cl. ................................ 73/40; 73/49.2; 73/118.1

(58) Field of Search .............................. 73/40, 49.2, 49.7, 73/49.1, 118.1, 40.5 R

(56) References Cited

U.S. PATENT DOCUMENTS

| | | | | |
|---|---|---|---|---|
| 4,608,857 | * | 9/1986 | Mertens et al. | 73/40.5 R |
| 4,715,214 | * | 12/1987 | Jveter et al. | 73/49.2 |
| 4,942,758 | * | 7/1990 | Cofield | 73/49.2 |
| 5,327,776 | * | 7/1994 | Yasui et al. | 73/49.2 |
| 5,361,622 | * | 11/1994 | Wall | 73/49.2 |
| 5,369,984 | * | 12/1994 | Rogers et al. | 73/49.2 |
| 5,507,176 | * | 4/1996 | Kammeraad et al. | 73/49.2 |
| 5,668,308 | * | 9/1997 | Denby | 73/49.2 |
| 5,696,317 | * | 12/1997 | Rychlick | 73/118.1 |
| 5,750,888 | * | 5/1998 | Matsumoto et al. | 73/118.1 |
| 5,850,036 | * | 12/1998 | Giromini et al. | 73/40 |
| 6,016,690 | * | 1/2000 | Cook et al. | 73/49.2 |
| 6,164,123 | * | 12/2000 | Corkill | 73/49.7 |

* cited by examiner

*Primary Examiner*—Hezron Williams
*Assistant Examiner*—David J. Wiggins
(74) *Attorney, Agent, or Firm*—Vincent A. Cichosz

(57) ABSTRACT

A method of validating a leak detection test for a fuel tank in a vehicle includes the steps of determining a vacuum decay rate of a fuel vapor in the fuel tank and dividing the vacuum decay rate into a set of adjacent segments distributed over a series of consecutive time intervals. The method also includes the steps of determining a slope of the segments, determining if a difference between two consecutive slopes of the segments meets a predetermined criteria, and validating the leak detection test if the difference meets the predetermined criteria.

9 Claims, 2 Drawing Sheets

METHOD OF VALIDATING A DIAGNOSTIC LEAK DETECTION TEST FOR A FUEL TANK

TECHNICAL FIELD

The present invention relates generally to fuel tanks for vehicles and, more particularly, to a method of validating a diagnostic leak detection test for a fuel tank in a vehicle.

BACKGROUND OF THE INVENTION

Increasing awareness of the effects of vehicle evaporative and exhaust emissions has resulted in regulations at both state and federal levels to control these emissions. In particular, on-board diagnostic regulations require that certain emission related systems on the vehicle be monitored, and that a vehicle operator be notified if the system is not functioning in a predetermined manner.

One example of an emission related system is a fuel system, which includes a fuel tank for storing a fuel. Vapors from the fuel collect within the fuel tank. Occasionally, the fuel tank may develop a leak due to a hole, such as from a sharp object puncturing the fuel tank. Therefore, vapors present within the tank may inadvertently escape from the fuel tank and into the atmosphere. A primary component of the fuel vapor is hydrocarbon, which is known to have a detrimental effect on air quality. Currently, on-board diagnostic regulations require that a diagnostic small leak test and a very small leak test be performed periodically while the vehicle is operational, to detect a leak in the fuel tank. If a leak is detected by the diagnostic test, the vehicle operator is notified.

Various test procedures are used to detect a small leak or very small leak in the fuel tank. In one example, an overall slope of a vacuum decay rate is determined by measuring an induced vacuum within the fuel tank at a beginning of a test and the vacuum at the end of the test. If the overall slope does not meet a predetermined criteria, there may be a leak in the fuel tank. One example of a predetermined criteria is a maximum slope threshold. However, a shortfall of the overall slope test procedure is that it does not account for conditions when the vacuum decay rate is not decreasing in a predictable manner, due to a typical operating condition of the vehicle. For example, fuel slosh, or turbulence of the fuel within the fuel tank occurs when the vehicle undergoes a series of sudden movements. Fuel slosh may affect the actual vacuum decay rate positively or negatively. Consequently, a driver occupant of the vehicle could either be erroneously notified of a malfunction, or fail to be notified, depending on the circumstance. Thus, there is a need in the art for a reliable method of validating a diagnostic leak detection test that is not sensitive to fluctuations in vehicle operating conditions.

SUMMARY OF INVENTION

It is, therefore, one object of the present invention to provide a method of validating a diagnostic leak detection test for a fuel tank on a vehicle.

It is another object of the present invention to provide a method of validating a diagnostic leak detection test for a fuel tank on a vehicle, that evaluates a rate of vacuum decay within discrete segments of time, to confirm the results of the diagnostic leak test.

To achieve the foregoing objects, the present invention is a method of validating a diagnostic leak test for a fuel tank on a vehicle. The method includes the steps of determining a vacuum decay rate of a fuel vapor in the fuel tank and dividing the vacuum decay rate into segments. The method also includes the steps of determining a slope of the segments, determining if a difference between two consecutive slopes of the segments meet a predetermined criteria, and validating the leak detection test if the difference meets the predetermined criteria.

One advantage of the present invention is that an improved test for detecting a leak in a fuel tank of a vehicle is provided. Another advantage of the present invention is that a method of validating a diagnostic leak detection test for the fuel tank compares a rate of vacuum decay for one segment with another segment, to confirm the results of the diagnostic leak detection test. Still another advantage of the present invention is that the method of validating a diagnostic leak detection test for the fuel tank is not affected by vehicle operating conditions. Yet another advantage of the present invention is that the method of validating a diagnostic leak detection test for the fuel tank compares consecutive slope segments of a vacuum decay rate, to determine if the overall curvature is convex.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
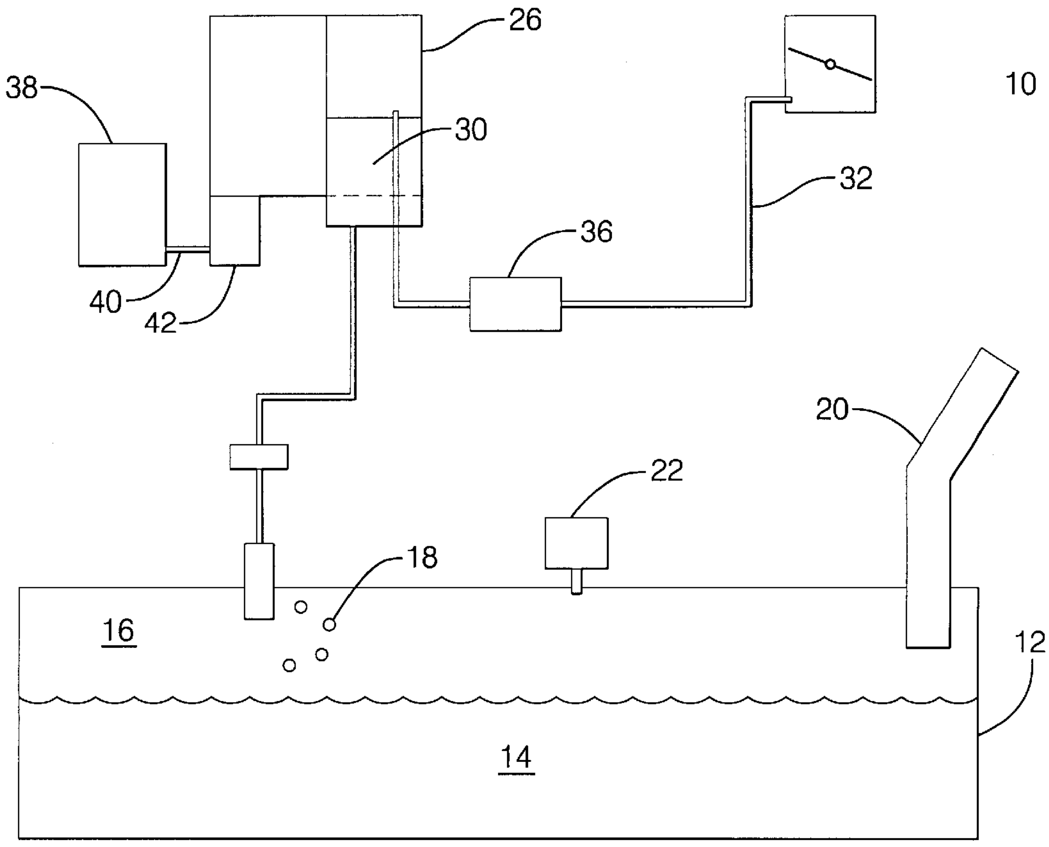
FIG. 1 is a schematic diagram of a fuel system, according to the present invention.

Referring to the drawings and in particular FIG. 1, one embodiment of a fuel system 10, according to the present invention, is shown for a vehicle (not shown). The fuel system 10 includes a fuel tank 12 that serves as a reservoir for holding a predetermined amount of fuel 14 to be supplied to a power source such as an engine (not shown). In this example, the fuel 14 is a liquid fuel, such as unleaded gasoline. It should be appreciated that the fuel tank 12 of this example is a closed system. The empty space within the fuel tank 12 is referred to in the art as a vapor dome area 16 and contains fuel vapor 18. As fuel 14 is drawn out of the fuel tank 12, the volume of fuel vapor 18 within the vapor dome area 16 increases.

The fuel system 10 includes a fuel filler tube 20 operatively disposed between the fuel tank 12 and an opening (not shown) in a body portion of the vehicle, to provide a pathway for the flow of fuel into the fuel tank 12. The fuel system 10 also includes a fuel pump (not shown) disposed within the fuel tank 12 for pumping the fuel 14 out of the fuel tank 12 and to the power source, as is known in the art.

The fuel system 10 includes a pressure sensing mechanism 22, such as a pressure sensor, disposed within the vapor dome area 16 of the fuel tank 12. The pressure sensing mechanism 22 measures the pressure within the fuel tank 12, as is known in the art.

The fuel system 10 also includes a pressure relief valve 24, also known as a rollover valve, that operatively directs the fuel vapor 18 from the fuel tank 12 into a vapor storage canister 26. The pressure relief valve 24 and vapor storage canister 26 are interconnected by a first conduit 28. The vapor storage canister 26 is an enclosed container for temporarily storing fuel vapor 18 from the vehicle's fuel tank 12. The vapor storage canister 26, as is known in the art, contains a predetermined amount of a buffering material 30, such as an activated charcoal, for absorbing the fuel vapor 18. It should be appreciated that the storage capacity of the vapor storage canister 26 is constrained by the volume of buffering material 30 after becoming saturated with fuel vapor 18. The vapor storage canister 26 is purged with fresh air to remove the fuel vapor 18 from the vapor storage canister 26 and restore the storage capacity of the vapor storage canister 26.

The fuel system 10 includes a second conduit 32 interconnecting the vapor storage canister 26 with a fuel actuating mechanism 34, such as a throttle body. The fuel system 10 also includes a purge valve 36 disposed within the second conduit 32. The purge valve 36 is operatively connected to a controller (not shown) that directs the valve 36 to open, so that the fuel vapors 18 flow into the fuel actuating mechanism 34 to be consumed within the power source as is known in the art.

The fuel system 10 further includes a filter 38 operatively connected by a third conduit 40 to a vent valve 42 that is integral with the vapor storage canister 26. The vent valve 42 operatively draws fresh air through the filter 38 and into the vapor storage canister 26, to fill the vapor storage canister 26 with fresh air and purge the vapor storage canister 26 of fuel vapor 18. It should be appreciated that the fuel system 10 may include other component parts such as valves, sensors or the like which are conventional and known in the art to operatively transfer the flow of fuel 14 and fuel vapor 18.

A diagnostic leak detection test is performed on the fuel tank 12 if a predetermined condition is right to perform the test. For example, the diagnostic leak detection test may be performed once per trip, as is known in the art. The purpose of the diagnostic leak detection test is to detect the presence in the fuel tank of a small leak, such as forty thousandths of an inch (0.040") or a very small leak, such as twenty thousandths of an inch (0.020"). If a leak is detected, an indicator (not shown), such as a malfunction indicator light, is illuminated by the controller.

It is known that a vacuum created within the fuel tank 12 would generally decay at a predetermined rate. A factor, such as a leak in the fuel tank 12, may affect the vacuum decay rate. Preferably, the diagnostic leak detection test uses the vacuum decay rate to indicate the presence of a leak. For example, if there is a leak in the fuel tank 12, a slope of the vacuum decay rate may be greater than the predetermined vacuum decay rate. In this example, the predetermined vacuum decay rate is representative of an exponential decay having a downwardly convex curvature. A condition such as fuel slosh may result in an erratic vacuum decay rate with portions of a curve that are excessively convex upward. A diagnostic leak detection test may falsely indicate a leak with this type of condition.

Figure 4:
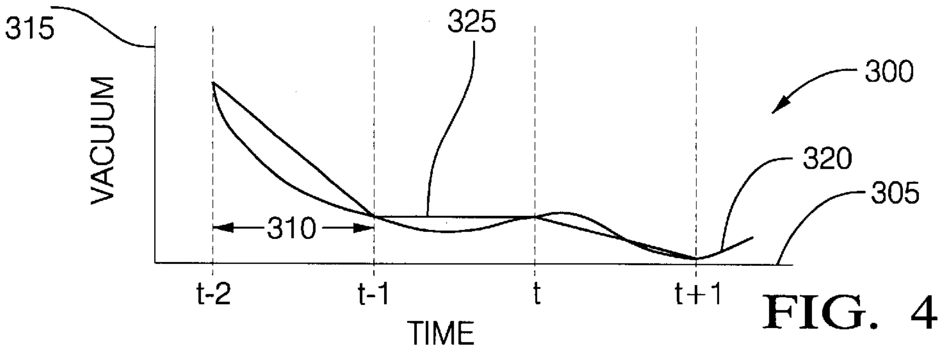
FIG. 4 is a graph illustrating an erratic vacuum decay rate, according to the method of FIG. 2.

In operation, the diagnostic leak test is initiated by closing the vent valve 42 and opening the purge valve 36, to draw a vacuum in the fuel tank 12. The purge valve 36 is then closed. Using knowledge of gas pressure behavior, a predetermined amount of fuel vapor 18 in the fuel tank 12 and a predetermined vacuum decay rate can be calculated. If the vacuum decay rate is different than the predetermined vacuum decay rate, there may potentially be a leak in the fuel tank 12. The vacuum decay rate may also indicate the size of the leak, such as small (0,040") or very small (0.020"). Advantageously, the method discriminates between a smoothly changing vacuum decay rate, and an erratic vacuum decay rate. For example, fuel slosh or a noisy pressure sensing mechanism 22 could result in an erratic vacuum decay rate, as shown in FIG. 4.

In this example, the vacuum decay rate is measured, and a slope of the vacuum decay rate is calculated. The slope is compared to a predetermined maximum slope to determine if the slope is less than the maximum slope for the segment, to determine if there is a leak in the fuel tank 12.

Figure 2:
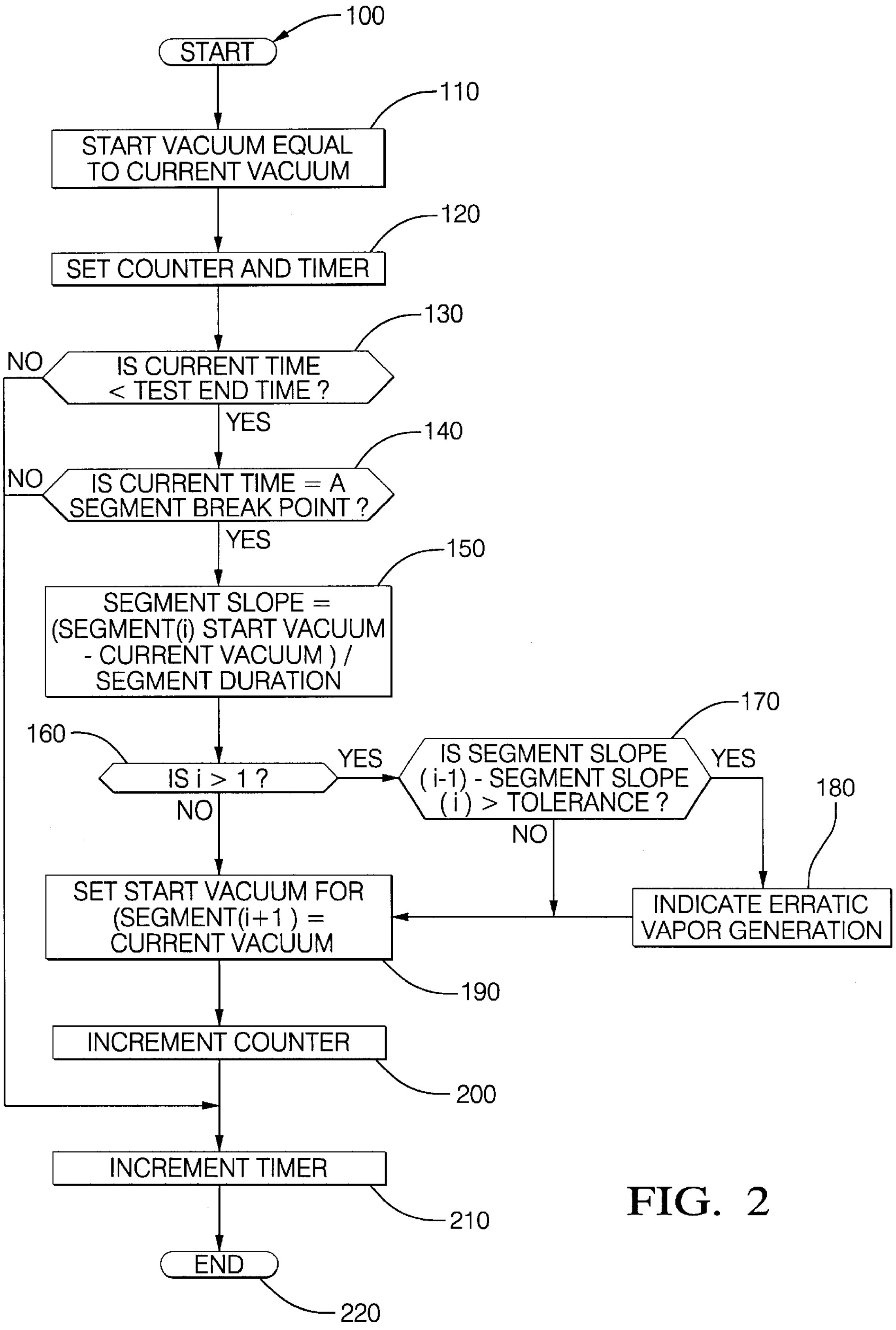
FIG. 2 is a flowchart of a method for validating a leak detection test for a fuel tank in a vehicle, according to the present invention.

Referring to FIG. 2, a method of validating a diagnostic leak detection test for the fuel tank 12 is illustrated. It should be appreciated, that in this example, the method confirms the results of the diagnostic leak detection test for the fuel tank 12. The methodology begins in bubble 100 when it is called for on a periodic basis by the controller and advances to block 110. In block 110, the methodology determines if a current vacuum has an initial value, and initializes the current vacuum by setting the current vacuum equal to a start vacuum if it does not have an initial value. The start vacuum is an initial vacuum measurement at the start of the diagnostic leak detection test. The methodology advances to block 120.

In block 120, the methodology determines if a counter has an initial value and initializes the counter if it does not have an initial value. For example, a time counter is set equal to a predetermined value such as zero (0), and a segment counter is set equal to a predetermined value such as 1 (one). Preferably, the test time period is divided into discrete intervals of time referred to as segments, and the segment counter references the segments. The methodology advances to diamond 130 and determines if a current time, as indicated by the time counter, is less than a predetermined end time for the test. If the current time is not less than the end time, the methodology advances to block 210, to be described. If the current time is less than the end time, the methodology advances to diamond 140.

In diamond 140, the methodology determines if the current time, as indicated by the time counter, is equal to a predetermined segment break point. A segment break point is an end point of the segment. If the current time is not equal to a segment break point, the methodology advances to block 210, to be described. If the current time is equal to a segment break point, the methodology advances to block 150.

In block 150, the methodology determines a segment slope for a current segment by calculating a slope of the vacuum decay rate for that segment. The current segment slope is equal to the difference between the start vacuum for the current segment minus a current vacuum for the current segment, divided by a length of time of the segment. The methodology advances to diamond 160.

In diamond 160, the methodology determines if a segment counter is greater than a predetermined value, such as one (1). Advantageously, more than one segment slope is required to make a comparison of consecutive segment slopes. If the segment counter is not greater than one, the methodology advances to block 190, to be described. If the segment counter is greater than one, the methodology advances to diamond 170.

In diamond 170, the methodology checks if the overall curvature of the slope is downwardly convex by determining if a difference between a previous segment slope and a current segment slope is greater than a predetermined tolerance. If the difference is not greater than a predetermined tolerance, the methodology advances to block 190.

If the difference is greater than the predetermined criteria, the rate of decay is not following a predetermined pattern, such as an exponential decay. This indicates that the fuel vapor generation is erratic and it is probable that fuel slosh has occurred. The methodology advances to block 180.

In block 180, the methodology has determined that the results of the leak detection test are not valid, since fuel vapor generation is erratic. Preferably, the leak detection test is repeated later in the trip. The methodology advances to block 190. In block 190, the methodology sets a starting vacuum for the next segment equal to a current vacuum measurement. The methodology advances to block 200 and increments the segment counter. The methodology advances next to block 210 and increments a timer counter. The methodology advances to bubble 200 and ends.

Figure 3:
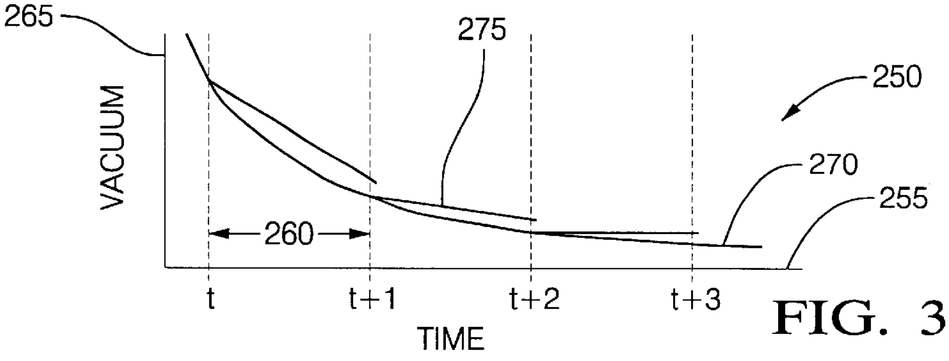
FIG. 3 is a graph illustrating a vacuum decay rate, according to the method of FIG. 2.

Referring to FIG. 3, a vacuum decay rate from a leak detection test for the fuel tank 12 is illustrated graphically at 250. The x-axis 255 represents the test period time and is divided into a plurality of discrete segments 260. The y-axis 265 represents a vacuum within the fuel tank 12. The curve, shown at 270, represents a vacuum decay rate in a fuel tank 12 during a leak detection test. Preferably, the overall curvature of the vacuum decay rate 270 is generally downwardly convex. A slope 275 is determined for each segment, using the previously described method. If the difference between the slope 275 for a previous segment 260 and the slope 275 of the current segment 260 do not meet a predetermined criteria, then the decay rate is not downwardly convex and the test results do not accurately indicate the presence of a leak. In this example, the diagnostic leak test is valid, since the segment slopes 275 meet the predetermined criteria.

Referring to FIG. 4, an erratic vacuum decay rate from a leak detection test for the fuel tank 12 is illustrated graphically at 300. The x-axis 305 represents the test period time, and is divided into a plurality of discrete segments 310. The y-axis axis 315 represents a vacuum within the fuel tank 12. The curve, shown at 320, represents the vacuum decay rate in a fuel tank 12 during a leak detection test. Preferably, the overall curvature of the vacuum decay rate is generally downwardly convex. A slope 325 is determined for each segment 310, using the previously described method. If the difference between the slope 325 for a previous segment 310 and the slope 325 of the current segment 310 meet a predetermined criteria, then the decay rate is not downwardly convex and the test results do not accurately indicate the presence of a leak. In this example, the leak detection test is not valid, since the vacuum decay rate 320 is not downwardly convex for each segment, and there may not be a leak in the fuel tank 12. However, the vacuum decay rate may be indicative of a temporary condition, such as fuel slosh.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of validating a leak detection test for a fuel tank in a vehicle, said method comprising the steps of:

determining a vacuum decay rate of a fuel vapor in the fuel tank;

dividing the vacuum decay rate into a set of adjacent segments;

determining a slope for each segment among the set of adjacent segments;

determining if a difference between two consecutive slopes of the segments meets a predetermined criteria; and validating the leak detection test if the difference meets the predetermined criteria.

2. A method as set forth in claim 1 wherein the slope of the segment is a difference between a vacuum at a start of the segment and a vacuum at the end of the segment, divided by a length of time of the segment.

3. A method of validating a leak detection test for a fuel tank in a vehicle, said method comprising the steps of:

determining a vacuum decay rate of a fuel vapor in the fuel tank;

dividing the vacuum decay rate into a set of adjacent segments;

determining a slope for each segment among the set of adjacent segments;

determining if a difference between two consecutive slopes of the segments meets a predetermined criteria;

validating the leak detection test if the difference meets the predetermined criteria; and wherein the predetermined criteria is that a curve of the vacuum decay rate is downwardly convex.

4. A method as set forth in claim 1 including the step of determining if it is time to validate the leak detection test.

5. A method of validating a leak detection test for a fuel tank in a vehicle, said method comprising the steps of:

determining if it is time to validate the leak detection test;

determining a vacuum decay rate of a fuel vapor in the fuel tank if it is time to validate the leak detection test;

dividing the vacuum decay rate into a set of adjacent segments;

determining a slope for each segment among the set of adjacent segments;

determining if a difference between two consecutive slopes of the segments is within a predetermined tolerance; and validating the leak detection test if the difference is within the predetermined tolerance.

6. A method as set forth in claim 5 wherein the slope of the segment is a difference between a vacuum at a start of the segment and a vacuum at the end of the segment, divided by a length of time of the segment.

7. A method of validating a leak detection test for a fuel tank in a vehicle, said method comprising the steps of:

determining if it is time to validate the leak detection test;

determining a vacuum decay rate of a fuel vapor in the fuel tank if it is time to validate the leak detection test;

dividing the vacuum decay rate into a set of adjacent segments;

determining a slope for each segment among the set of adjacent segments;

determining if a difference between two consecutive slopes of the segments is within a predetermined tolerance;

validating the leak detection test if the difference is within the predetermined tolerance; and wherein a curve of the vacuum decay rate is downwardly convex for the segment.

8. A method of validating a leak detection test in a fuel tank in a vehicle, said method comprising the steps of:

determining if it is time to validate the leak detection test;

determining a vacuum decay rate of a fuel vapor in the fuel tank if it is time to validate the leak detection test;

dividing the vacuum decay rate into a set of adjacent segments;

determining a current segment slope of the vacuum decay rate for each segment among the set of adjacent segments as a difference between a vacuum at a start of each segment and a vacuum at the end of each segment, divisible by the length of each segment over time;

determining if a difference between a previous segment slope and the current segment slope is within a predetermined tolerance; and indicating that the leak detection test is valid if the difference between the previous segment slope and current segment slope is within a predetermined tolerance.

9. A method of validating a leak detection test in a fuel tank in a vehicle said method comprising the steps of:

determining if it is time to validate the leak detection test;

determining a vacuum decay rate of a fuel vapor in the fuel tank if it is time to validate the leak detection test;

dividing the vacuum decay rate into a set of adjacent segments;

determining a current segment slope of the vacuum decay rate for each segment among the set of adjacent segments as a difference between a vacuum at a start of each segment and a vacuum at the end of each segment, divisible by the length of each segment over time;

determining if a difference between a previous segment slope and the current segment slope is within a predetermined tolerance;

indicating that the leak detection test is valid if the difference between the previous segment slope and current segment slope is within a predetermined tolerance; and wherein a curve of the vacuum decay rate is downwardly convex for the segment.

* * * * *